(12) United States Patent
Kuo et al.

(10) Patent No.: US 8,184,709 B2
(45) Date of Patent: May 22, 2012

(54) LOW-POWER AND HIGH-THROUGHPUT DESIGN OF FAST MOTION ESTIMATION VLSI ARCHITECTURE FOR MULTIMEDIA SYSTEM-ON-CHIP DESIGN

(75) Inventors: Sy-Yen Kuo, Taipei (TW); Shih-Chia Huang, Taipei (TW)

(73) Assignee: National Taiwan University, Taipei (TW)

( * ) Notice: Subject to any disclaimer, the term of this patent is extended or adjusted under 35 U.S.C. 154(b) by 395 days.

(21) Appl. No.: 12/505,468

(22) Filed: Jul. 18, 2009

(65) Prior Publication Data

US 2010/0091863 A1 Apr. 15, 2010

(30) Foreign Application Priority Data

Oct. 14, 2008 (TW) .................................. 97139374 A

(51) Int. Cl.
*H04N 7/12* (2006.01)
(52) U.S. Cl. .............. 375/240.16; 375/240; 375/240.01; 375/240.02

(58) Field of Classification Search ........................ None
See application file for complete search history.

(56) References Cited

U.S. PATENT DOCUMENTS

| 7,362,808 B2 * | 4/2008 | Kang ........................ 375/240.16 |
| 2006/0155701 A1 * | 7/2006 | Huang et al. ........................ 707/6 |
| 2006/0280248 A1 * | 12/2006 | Kim et al. ................. 375/240.16 |
| 2007/0297512 A1 * | 12/2007 | Lee et al. ................. 375/240.16 |
| 2008/0025406 A1 * | 1/2008 | Kim et al. ................. 375/240.24 |

* cited by examiner

*Primary Examiner* — Mehrdad Dastouri
*Assistant Examiner* — James Anderson, II
(74) *Attorney, Agent, or Firm* — Jianq Chyun IP Office

(57) ABSTRACT

A method of fast motion estimation in VLSI architecture with low-power and high-throughput for multimedia System-on-Chip design is disclosed. The method uses the data prediction and data reuse technique to find out the best matching block within the search range of the reference frame for the target block in the current frame in order to obtain the respective motion vector. The external memory bandwidth and the internal memory size in the video coding system are significantly reduced so as to speed up the process of motion estimation and most of the power consumption for the motion estimation process is further saved in the embedded video coding systems.

6 Claims, 13 Drawing Sheets

LOW-POWER AND HIGH-THROUGHPUT DESIGN OF FAST MOTION ESTIMATION VLSI ARCHITECTURE FOR MULTIMEDIA SYSTEM-ON-CHIP DESIGN

BACKGROUND OF THE INVENTION

1. Field of the Invention

The present invention relates generally to a method of fast motion estimation, and more particularly to a method employing data prediction and data reuse technique for fast motion estimation.

2. The Prior Arts

In order to save the storage medium space for storing image data and reduce the bandwidth used for transmitting the image data, original image data is often compressed to obtain compressed image data. When the image data is to be displayed, the compressed image data is recovered to displayable image data by executing a decompression process. The compression process is known as a coding process, while the decompression process is known as a decoding process.

FIG. 1 is a block diagram schematically illustrating the operation of a conventional image data coding system. Referring to FIG. 1, the image data coding system includes motion estimation S10, motion compensation S12, block codes S14, and variable length codes S16, by which P-frame bitstream, i.e., the compressed data, can be generated. Among the foregoing, the motion estimation S10 occupies very much system resources, such as memory space, computation time, and power consumption. Generally speaking, the motion estimation may occupy 76% of memory access, 77% of memory bandwidth, and 78% of computation time. As such, it is very highly desired to enhance the efficiency of the motion estimation S10 and improve the entire coding efficiency.

FIG. 2 is a schematic diagram illustrating the motion prediction of the conventional technology. Referring to FIG. 2, a search range 50 is selected from a reference frame 40 according to a current block 30 in a current frame 20. Then, a best matching algorithm (BMA) is utilized to find out a best matching block 60 from all reference blocks in the search range 50, thus obtaining a corresponding motion vector provided for subsequent variable length codes S16. Supposing that the current block 30 is an N×N block, in which N represents a side length of the current block, e.g., 16 as exemplified hereby. The BMA is defined by the following equation.

$$SAD(i, j) = \sum_{m=0}^{15} \sum_{n=0}^{15} |X(m, n) - Y(m+i, n+j)|$$

In the equation, SAD represents a sum of absolute differences (SAD), X(m, n) represents the image data of the current block 30 at coordinates (m, n), Y(m+i, n+j) represents the image data of the reference block at coordinates (m+i, n+j), in which i is a horizontal coordinate, and j is a vertical coordinate, and i and j are integers. The best matching block 60 is reference block having a minimum SAD value. MV(i, j) shown in FIG. 2 represents a motion vector directed from coordinates (m, n) to coordinates (m+i, n+j).

FIG. 3 is a functional block diagram illustrating a conventional image data coding system. Referring to FIG. 3, a conventional image data coding system 1 includes an encoder 70, for searching for a best matching block 60 in the search range 50 of the reference frame 40. The encoder 70 loads data stored in an external memory 84 via an external bus 90 and a memory interface 82. The data stored in the external memory 84 is the data of the reference block in the search range 50. The encoder 70 includes an encoding engine 72, an internal memory 74, and a computation engine 76. The internal memory 74 is adapted for storing the data loaded from the external memory 84. The computation engine 76 executes a logical computation to obtain the SAD value. The encoding engine 72 finds out the best matching block 60 having the minimum SAD according to the SAD value obtained by the computation engine 76.

For calculating the SAD value, data of the external memory 84 must be very frequently loaded to the internal memory 74. As such, the external bus 90 is required for a large data bandwidth, and the computation engine 76 has to deal with a very heavy load, so that the entire coding efficiency is drastically impaired. Further, a longer time that the computation lasts means a higher power it consumes, thus shortening the operation time of the handheld apparatus is supplied with power by a battery system. Moreover, more data needed to load means a larger capacity of memory required, which inevitably increases the hardware cost of the coding system. As such, several data access schemes for accessing data of the search range are proposed by the conventional technology for saving data transmission and enhancing data reuse. The data access schemes include Level A, Level B, Level C, Level D, and Level C+.

FIG. 4 is a schematic diagram illustrating the search range of the conventional BMA. Referring to FIG. 4, the search range 50 has a width $SR_H+N-1$, a height $SR_V+N-1$, a horizontal searching range $SR_H$, and a vertical searching range $SR_V$. A reference block 61 positioned at a center point of the search range 50 is an N×N block, in which each of the values is counted by pixel as the unit thereof, and $SR_H=2P_H$, and $SR_V=2P_V$.

FIG. 5 is a schematic diagram illustrating the Level A scheme of the conventional technology. Referring to FIG. 5, in the search range 50, an overlap region 62 between two successive reference blocks is shown as the dashed region in FIG. 5. As such, whenever a next reference block is searched, N×1 pixels data must be loaded from the external memory 82 in advance. Therefore, the size of the internal memory 74 is N×(N−1). However, when data is frequently accessed, the external bus 90 suffers a very heavy load, and the data is not effectively reused.

FIG. 6 is a schematic diagram illustrating the Level B scheme of the conventional technology. Referring to FIG. 6, a search band 51 of the search range 50 in the external memory 82, as a whole, is retrieved by the coding system. The search band 51 has a width $SR_H+N-1$, and a height N. The coding system obtains the SAD value of a corresponding reference block from the search band 51. An overlap region 62 of two successive search bands 51 and 52 is shown as the dashed region in FIG. 6. The overlap region 62 occupies a size (N−1)×($SR_H+N-1$) of the internal memory 74. The data in the overlap region 62 can be reused according to the Level B scheme. In other words, when the coding system executes a next time SAD calculation, the data in the overlap region 62 is not required to be reloaded into the internal memory anymore. Such data has been loaded in advance, and only data of 1×($SR_H+N-1$) is required to be loaded therein. Therefore, the data load bandwidth can be drastically reduced.

FIG. 7 is a schematic diagram illustrating the Level C scheme of the conventional technology. Referring to FIG. 7, the coding system divides the data of the search range 50 into two stages for loading into the internal memory 74. At the first time, a search band 51 is loaded. The search band 51 has a width $SR_H+N-1$, and a height $SR_V+N-1$. Then the SAD value is calculated, in which the two successive current blocks CB0, CB1 are selected from left to right as indicated by the arrow shown thereby. Then, another search band 52 is loaded. The search band 52 has a width $SR_H+N-1$, and a height $SR_V+N-1$. However, there is an overlap region 62 between the search band 51 and the search band 52 existed as shown as the dashed region in FIG. 7. As such, only data of $(N+SR_V-1)\times(N+SR_H-1)$ is required to be loaded. In other words, the size of the internal memory 74 is $(N+SR_V-1)\times(N+SR_H-1)$. Comparing with Level B scheme, the Level C scheme only needs to twice retrieve data from the external memory, and therefore the data load bandwidth can be drastically reduced.

FIG. 8 is a schematic diagram illustrating the Level D scheme of the conventional technology. Referring to FIG. 8, the Level D scheme is similar to the Level C scheme discussed above. The coding system divides the data of the search range 50 into two stages, i.e., search bands 51 and 52, for loading into the internal memory 74. Different from the Level C scheme shown in FIG. 7, in which the search bands are vertically partitioned, the Level D scheme shown in FIG. 8 horizontally partitions the search bands. The search bands 51, 52 have a width $SR_H+W-1$, a height $SR_V+N-1$, in which W is the width of an image. The overlap region 62 of the search bands 51, 52 is shown as the dashed region in FIG. 8. Further, two successive current blocks CB0 and CB1 are selected from upside to downside. Therefore, the size of the internal memory 74 is $(SR_H+W-1)\times(SR_V-1)$.

FIG. 9 is a schematic diagram illustrating the Level C+ scheme of the conventional technology. Referring to FIG. 9, the Level C+ scheme is similar to the Level C scheme and the Level D scheme discussed above. According to the Level C+ scheme, the search range 50 is horizontally partitioned and vertically partitioned into four for loading. As such, the size of the internal memory 74 is $(SR_H+N-1)\times(SR_V+nN-1)$, in which n=2. The four successive current blocks CB0, CB1, CB2, and CB3 are selected in a zigzag manner, indicated by the arrow shown in FIG. 9.

The load bandwidth BW of the external bus 90 is represented by the following equation:

$$BW = f \times W \times H \times N \times Ra,$$

in which f represents the frame rate, N represents the number of the searched reference frames, W represents the frame width, H represents the frame height, and Ra represents the average external pixel access count for each current pixel in its motion estimation process, and can be defines as:

Ra=total number of external memory accesses in task/
the current pixel count in task As such, Ra of the Level A scheme can be expressed as:

$$Ra = SR_V \times \left(1 + \frac{SR_H}{N}\right);$$

Ra of the Level B scheme can be expressed as:

$$Ra = \left(1 + \frac{SR_V}{N}\right) \times \left(1 + \frac{SR_H}{N}\right);$$

Ra of the Level C scheme can be expressed as:

$$Ra = N \times \frac{SR_V + N - 1}{N \times N} = 1 + \frac{SR_V}{N};$$

Ra of the Level D scheme can be expressed as: Ra=1; and Ra of the Level C+ scheme can be expressed as:

$$Ra = N \times \frac{SR_V + nN - 1}{N \times nN} = 1 + \frac{SR_V}{nN}.$$

Comparing the load bandwidths corresponding to the foregoing Level A, Level B, Level C, Level D, and Level C+ schemes, it can be learnt that the Level C scheme and the Level C+ scheme have relative good reusability.

However, the Level C and Level C+ schemes require for more internal memory spaces, for saving a large amount of image data of the search ranges, thus reducing the data accessing frequency of accessing the external memory. In other words, the hardware cost is traded off for saving the computation time and reducing the load bandwidth. Therefore, the Level C and Level C+ schemes have not solved the problems as expected.

Further, according to the Level C and Level C+ schemes, the best matching blocks are found out by a full search block matching algorithms (FSBMA). Although easy to apply, the schemes do not have high search efficiency, and do not have an improved search speed. As such, the coding system still consumes too much power.

Therefore, a method for fast estimation prediction which is adapted for reducing the load bandwidth and saving hardware cost is highly desired for employing a fast searching method with a high data reusability for solving the disadvantages of the conventional technology, i.e., high data load bandwidth and slow searching speed, without changing the architecture of the coding system.

SUMMARY OF THE INVENTION

A primary objective of the present invention is to provide a data predication method for a memory. According to the data prediction method, desired data is transmitted to the internal memory by data prediction. Then, a data reuse technique is used for reducing the data load bandwidth of retrieving data from an external memory, and saving the power consumption of the coding system. In such a way, the best matching block which is best matched with a target block is searched from the search range of the reference frame. Then, a motion vector is obtained for completing the motion prediction process of the coding operation.

A further objective of the present invention is to provide a data prediction method for a fast memory. According to the data prediction method, the data can be transmitted through the data bus with a less time, thus increasing the searching speed. Therefore, the power consumption of the coding system can be saved, and less internal memory space is required, so that the hardware cost and the overall power consumption can be saved.

BRIEF DESCRIPTION OF THE DRAWINGS

The present invention will be apparent to those skilled in the art by reading the following detailed description of a preferred embodiment thereof, with reference to the attached drawings, in which.

DETAILED DESCRIPTION OF THE PREFERRED EMBODIMENT

The accompanying drawings are included to provide a further understanding of the invention, and are incorporated in and constitute a part of this specification. The drawings illustrate embodiments of the invention and, together with the description, serve to explain the principles of the invention.

Figure 1:
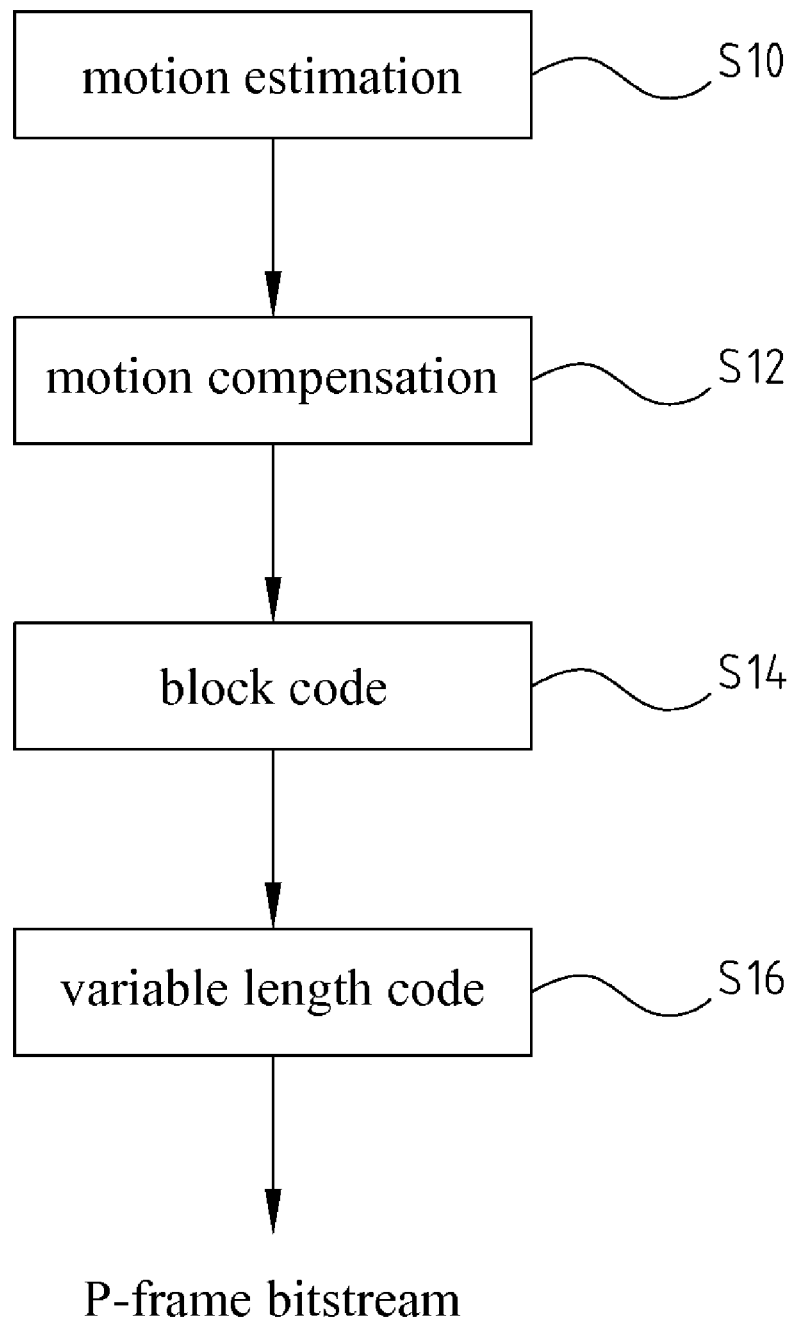
FIG. 1 is a block diagram schematically illustrating the operation of a conventional image data coding system.
Figure 2:
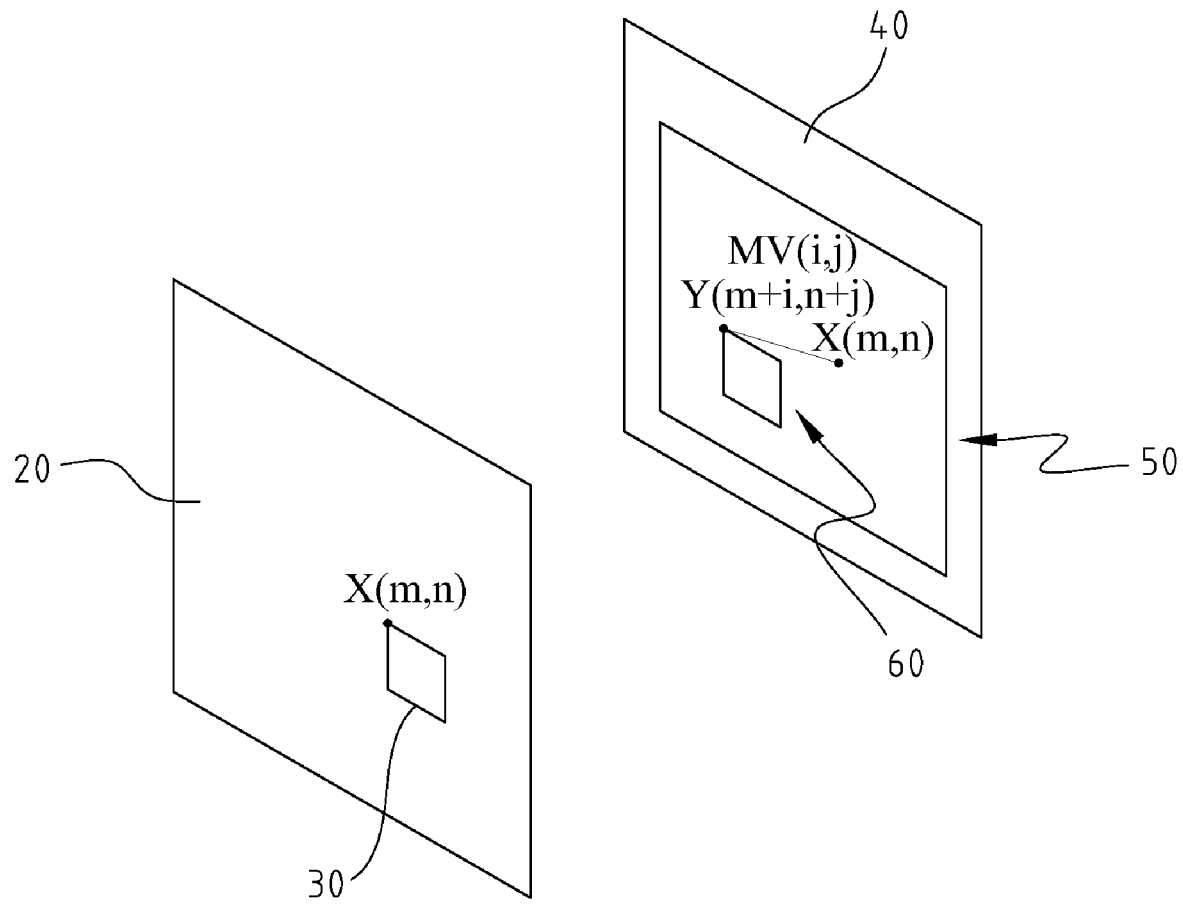
FIG. 2 is a schematic diagram illustrating the motion prediction of the conventional technology.
Figure 3:
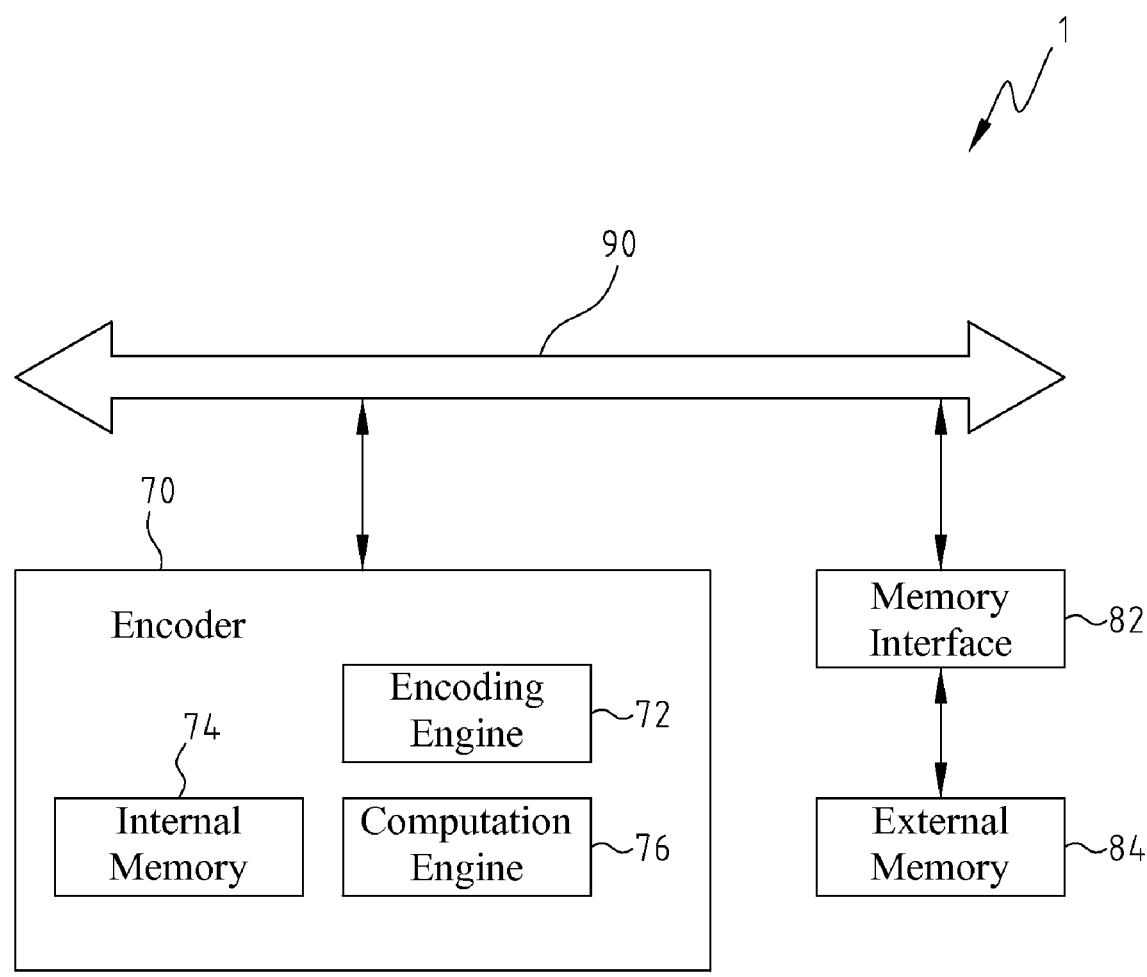
FIG. 3 is a functional block diagram illustrating a conventional image data coding system.
Figure 4:
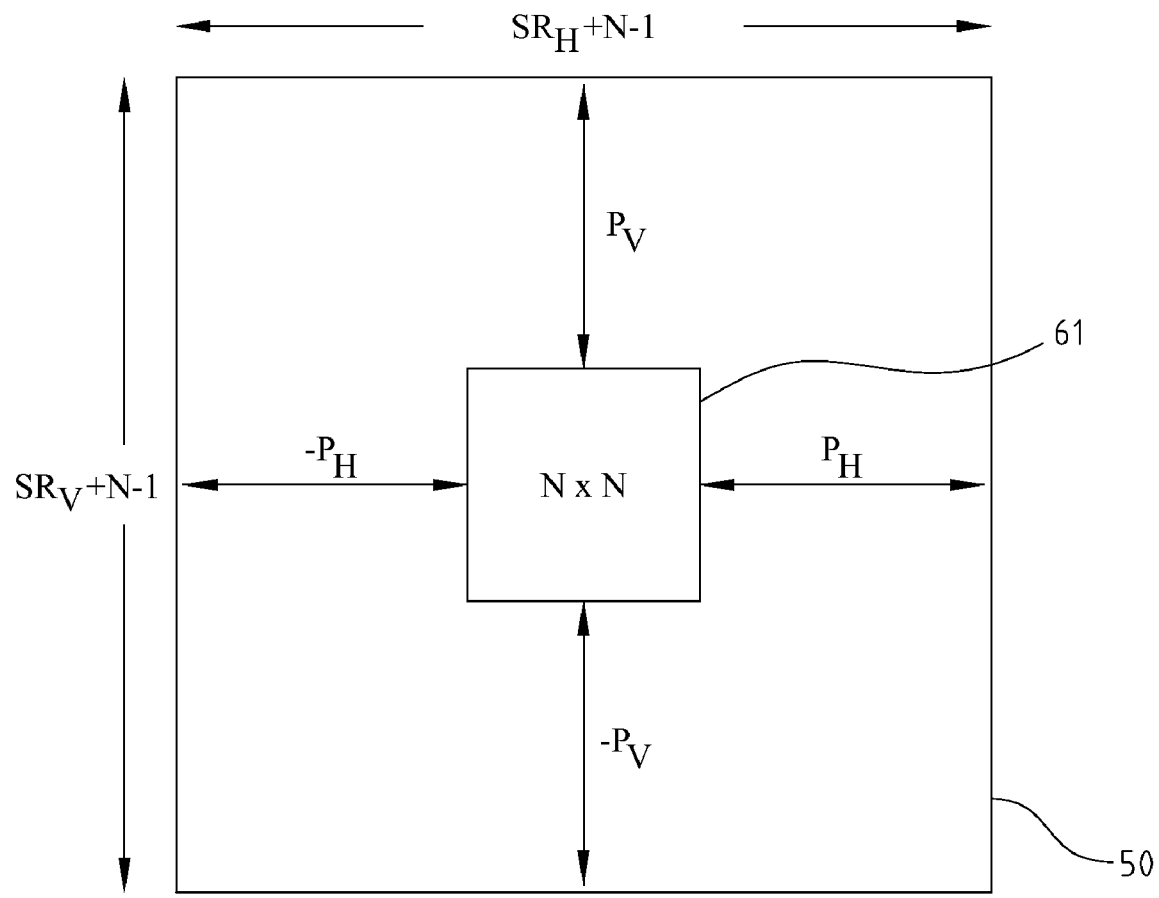
FIG. 4 is a schematic diagram illustrating the search range of the conventional BMA.
Figure 5:
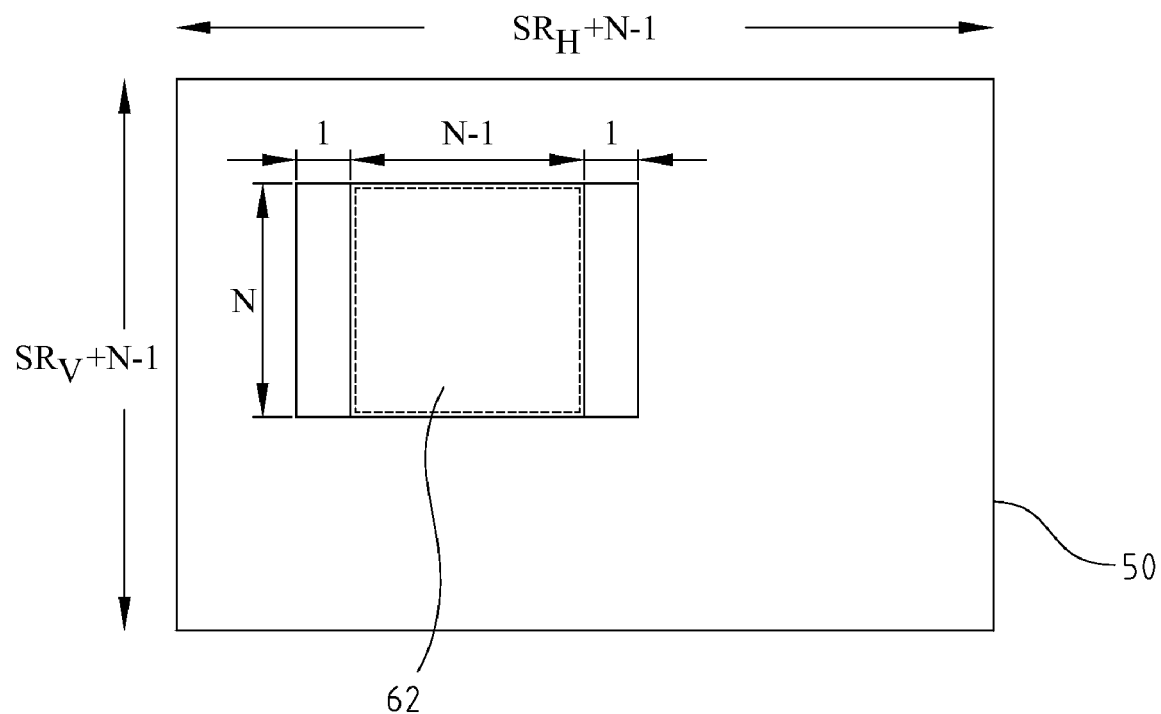
FIG. 5 is a schematic diagram illustrating the Level A scheme of the conventional technology.
Figure 6:
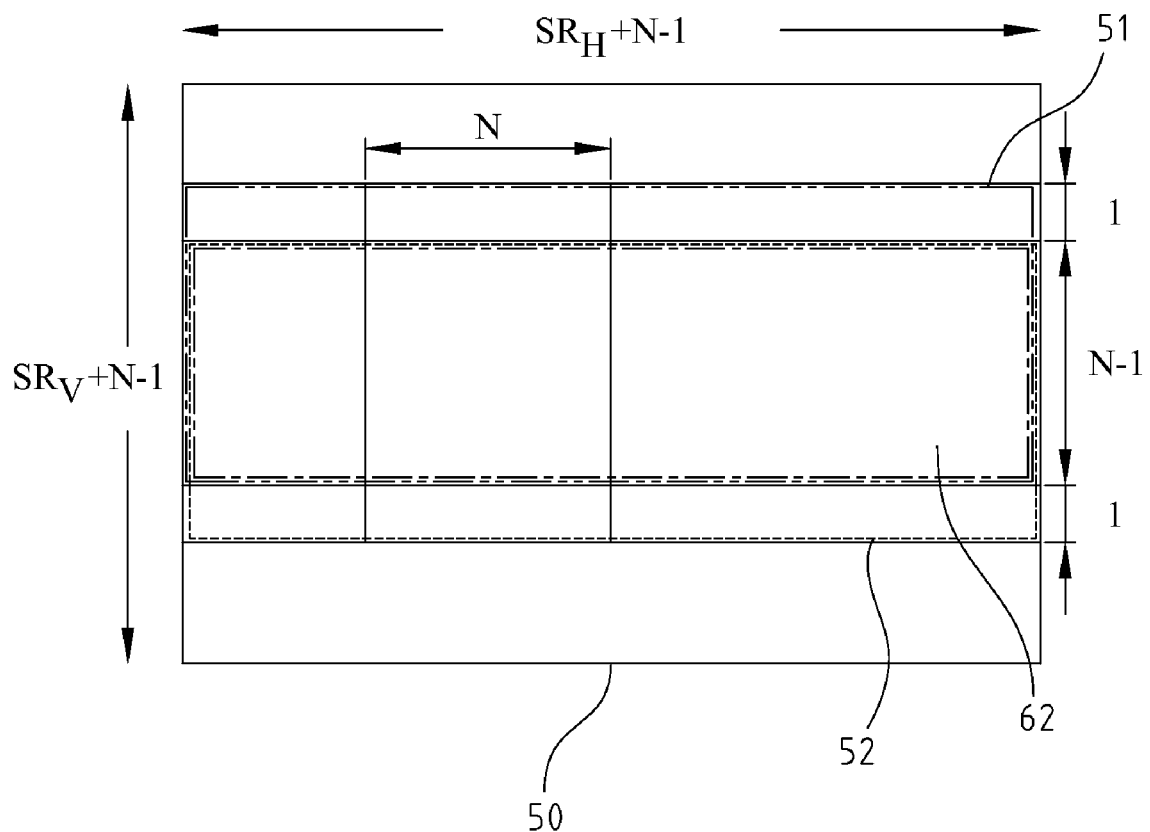
FIG. 6 is a schematic diagram illustrating the Level B scheme of the conventional technology.
Figure 7:
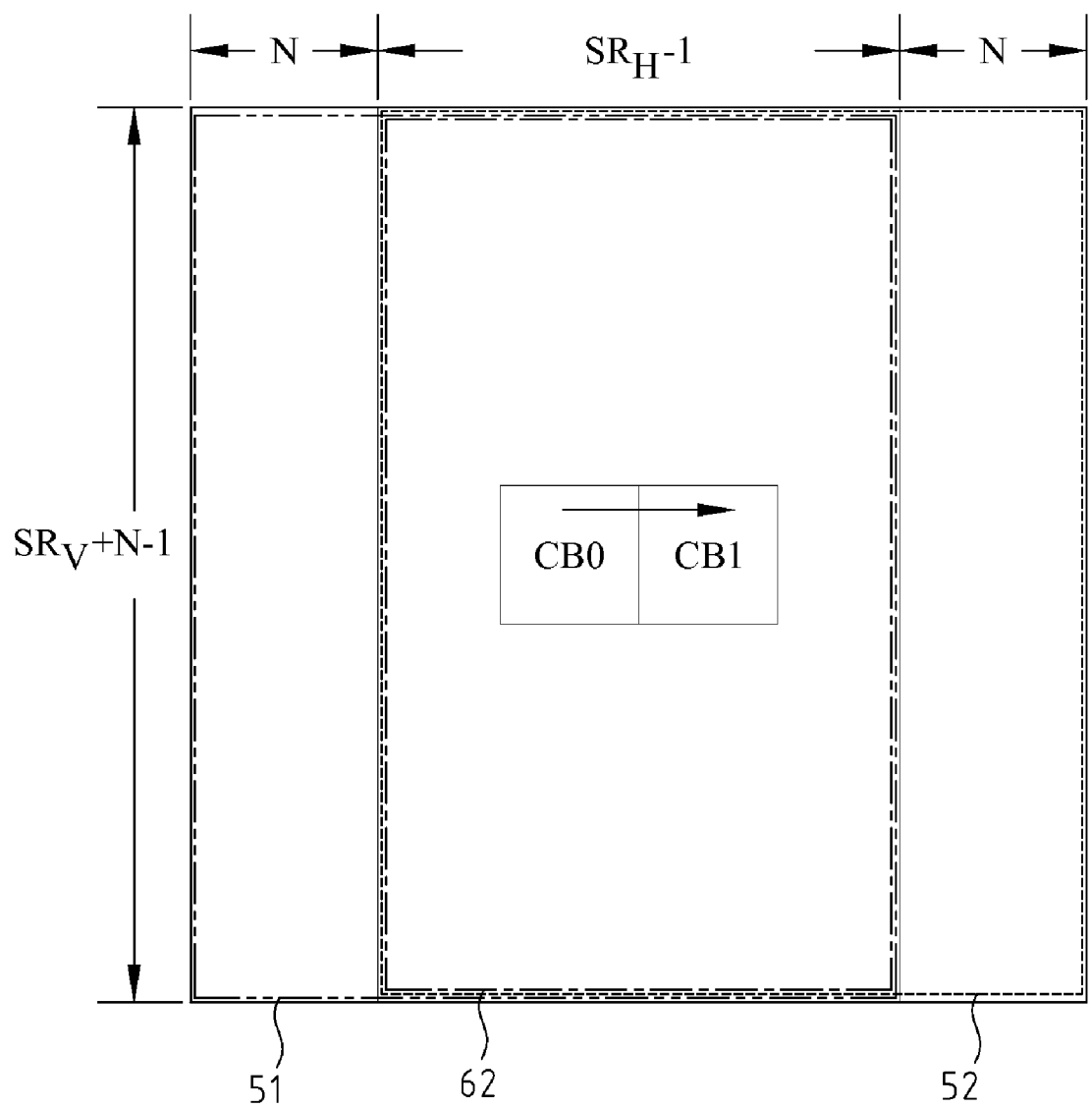
FIG. 7 is a schematic diagram illustrating the Level C scheme of the conventional technology.
Figure 8:
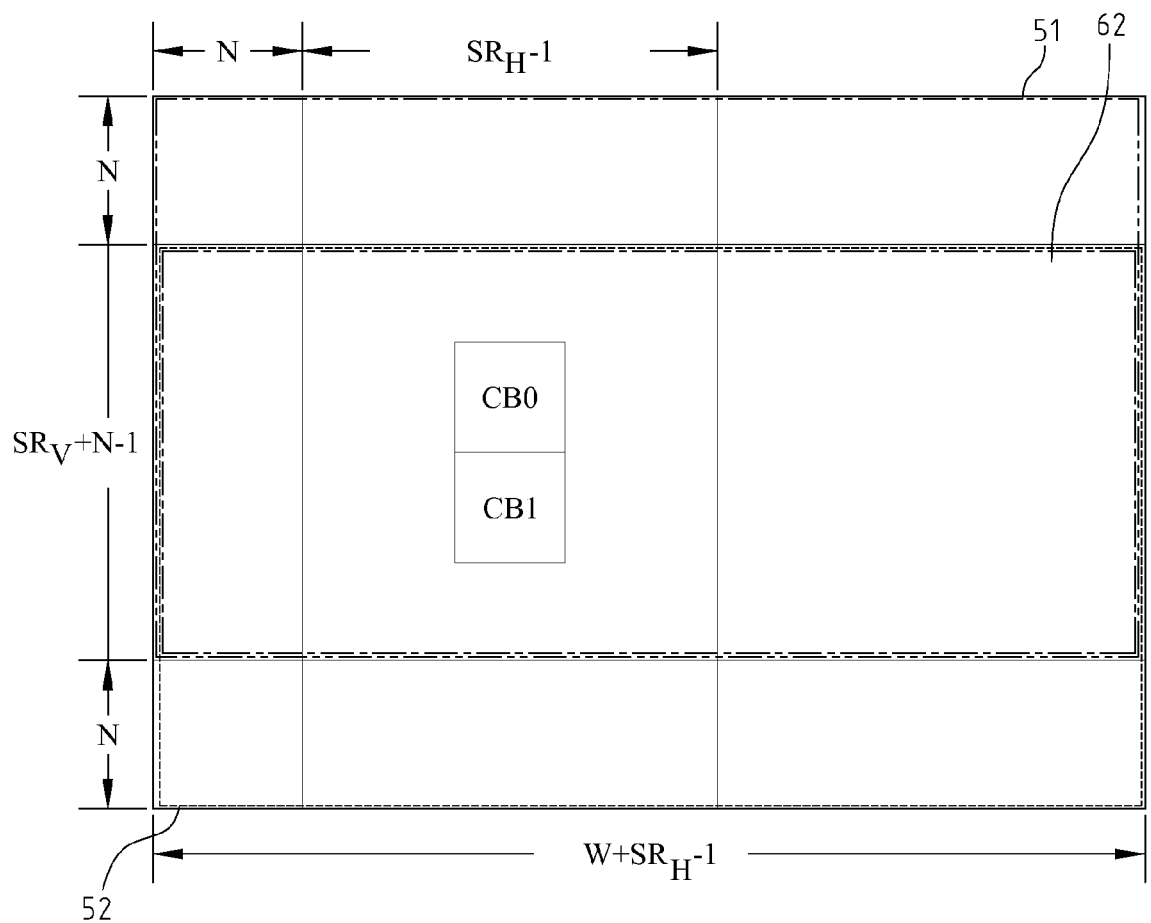
FIG. 8 is a schematic diagram illustrating the Level D scheme of the conventional technology.
Figure 9:
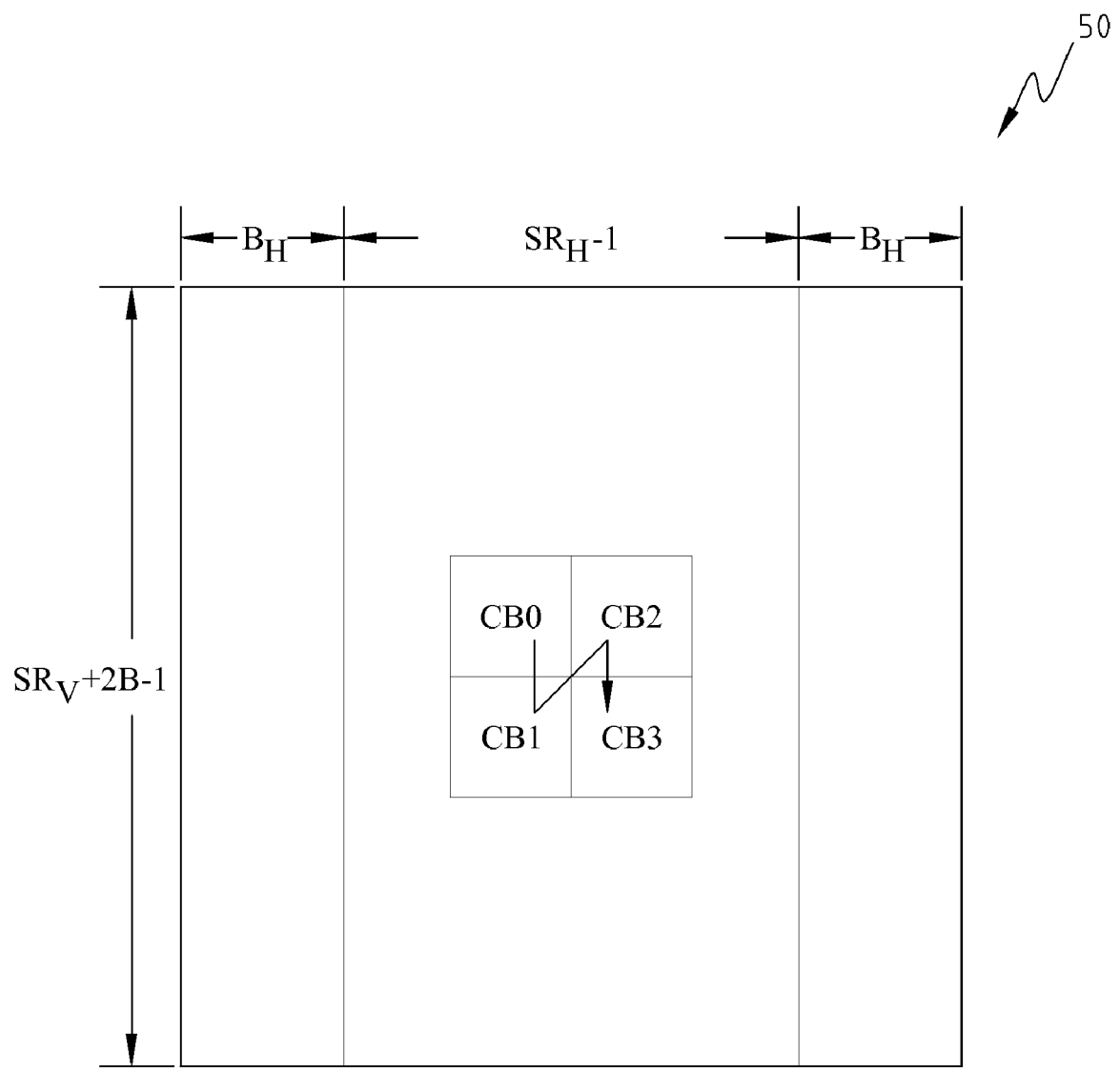
FIG. 9 is a schematic diagram illustrating the Level C+ scheme of the conventional technology.
Figure 10:
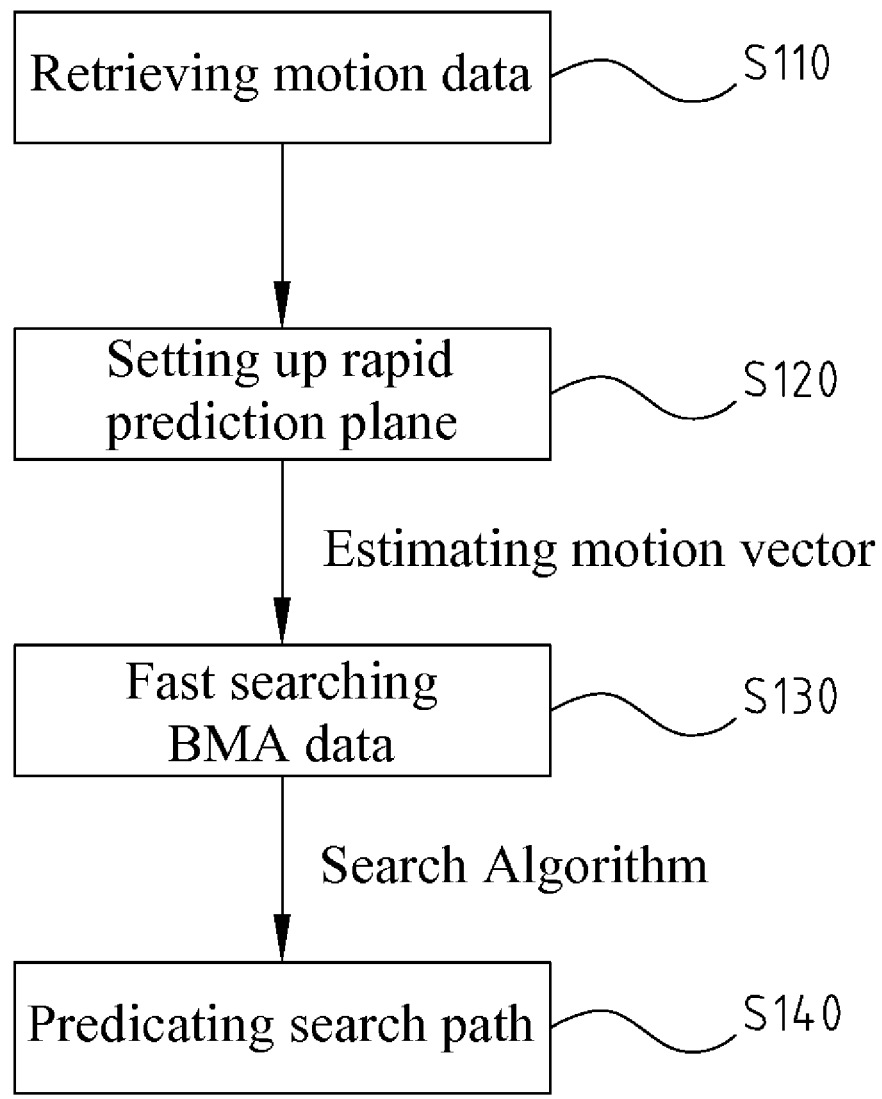
FIG. 10 is a flow chart illustrating a method of fast motion estimation according to an embodiment of the present invention.
Figure 11A:
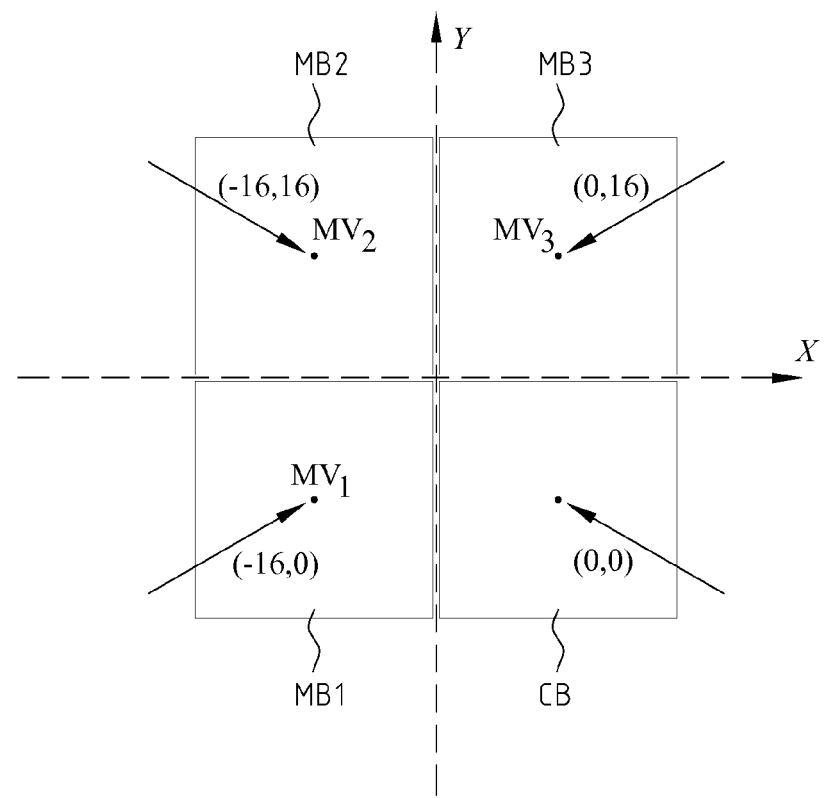
FIG. 11 is a schematic diagram illustrating a fast motion estimation plane according to an embodiment of the present invention.
Figure 11B:
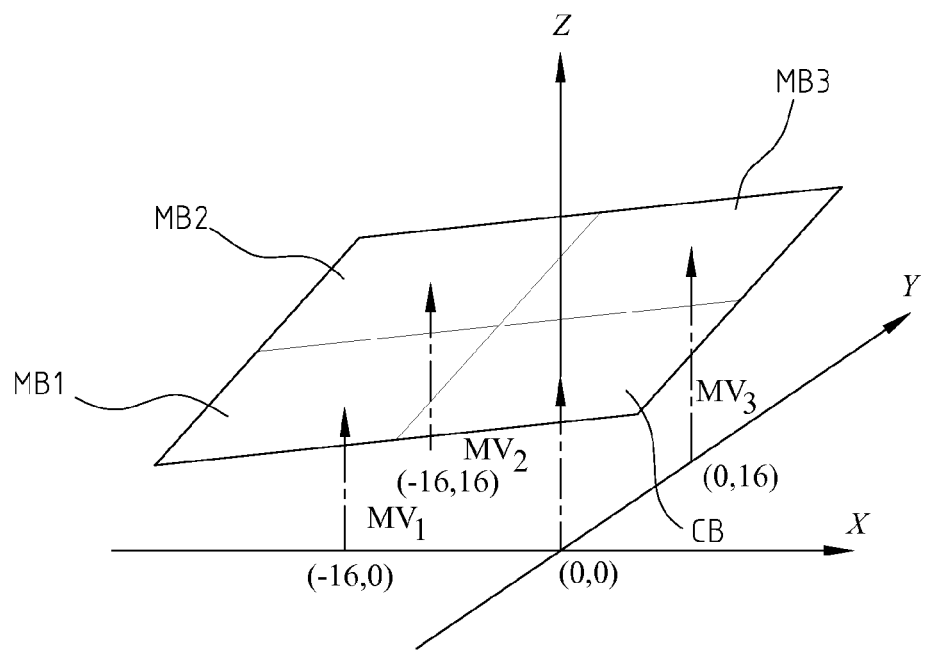

The present invention provides a method of fast motion estimation. The method of fast motion estimation is adapted for conducting a motion estimation process in two stages, i.e., building a rapid prediction plane and utilizing a high effective search path. FIG. 10 is a flow chart illustrating a method of fast motion estimation according to an embodiment of the present invention. FIG. 11 is a schematic diagram illustrating a fast motion estimation plane according to an embodiment of the present invention. For better understanding the operation procedure of the present invention, please refer to FIGS. 10 and 11 together.

First at step S110, a motion data of the current block of the coding data is retrieved, and then the flow goes to step S120. At step S120, a rapid prediction plane is set up according to a significantly strong spatial correlation of motion vectors of three neighboring blocks of the current block, in which the neighboring blocks of the current block includes a left block, an upper block, and an upper-left block. According to the rapid prediction plane, the method of fast motion estimation predicts the motion vector of the current block in the search range, and thus predicts a search path of the current block in the search range. As such, the method of fast motion estimation of the present invention is adapted for more effectively saving the searching time, accelerating the searching speed, saving the computation power consumption, and improving the overall efficiency of the searching process.

As shown in FIG. 11(*a*), assuming that in the two-dimensional (2-D) real space current frame with each pixel size equaling one unit, the coordinates of a center of the current block is set at (0, 0), then three blocks most adjacent to the current block CB are a left block MB1, an upper-left block MB2, and the upper block MB3, positioned at the left side MB1, the upper-left side, and the upper side of the current block CB, respectively. The center of the left block MB1 has the coordinates of (−16, 0). The center of the upper-left block MB2 has the coordinates of (−16, 16). The center of the upper block MB3 has the coordinates of (0, 16). Further, the left block MB1 has a motion vector MV1. The upper-left block MB2 has a motion vector MV2. The upper block MB3 has a motion vector MV3. The rapid prediction plane is set up according to the equation as following.

$$\frac{X}{a} + \frac{Y}{b} + \frac{Z(X,Y)}{c} = 1.$$

where (x, y) is the coordinate of the block center and Z(x, y) is the correlated motion vector of the coordinate (x, y), and a, b, and c are respectively represented as:

$$a = 16 \times (MV_1 - MV_2 + MV_3)/(MV_2 - MV_3)$$

$$b = 16 \times (MV_1 - MV_2 + MV_3)/(MV_1 - MV_2)$$

$$c = MV_1 - MV_2 + MV_3$$

Referring to FIG. 11(*b*), there are shown the rapid prediction plane set up according to the motion vectors MV1, MV2, and MV3, and there is also shown the estimated motion vector of the current block CB. If the motion vectors of the nearest adjacent blocks of the current block CB (e.g., the upper-leftmost current block) are not available, then the time correlated motion vector of the same spatial position is employed for estimating the current motion vector.

Further, as shown in FIG. 10, after step S120, the flow goes to step S130. At step S130, a best matching algorithm, e.g., the diamond search algorithm, is selected, according to the fast-search BMA. The diamond search algorithm includes four points, upper, left, lower, and right points which are equally distant from the target point as a center thereof for a distance.

After step S130, the flow goes to step S140. At step S140, the search path of each current block in the search range is predicted for each fast-search BMA, and the BMA is calculated for obtaining the best matching block, thus obtaining the a motion vector of the current block relative to the best matched reference block. Taking the diamond search algorithm for example, a best matched point, i.e., a point corresponding to the block having the minimum SAD value, regarding blocks corresponding to the upper, left, lower, and right points is achieved. Then, four points, upper, left, lower, and right points, which are equally distant from the achieved best matched point as a center thereof for a half of the distance are achieved. And then a next best matched point is obtained regarding blocks corresponding to the presently achieved upper, left, lower, and right points, and so forth. The method of fast motion estimation according to the present invention loads the whole data within the predicted search path of current blocks. As such, the method of fast motion estimation according to the present invention not only reuses the data from different search steps to avoid blind data transfer between internal memory and the computation engine, but also avoids loading unnecessary data to the internal memory for each fast-search BMA. Additionally, the method of fast motion estimation according to the present invention reuses data of the two overlapped search paths of two horizontal adjacent blocks, and therefore can reduce the data bandwidth of the external memory and the size of the internal memory.

Figure 12:
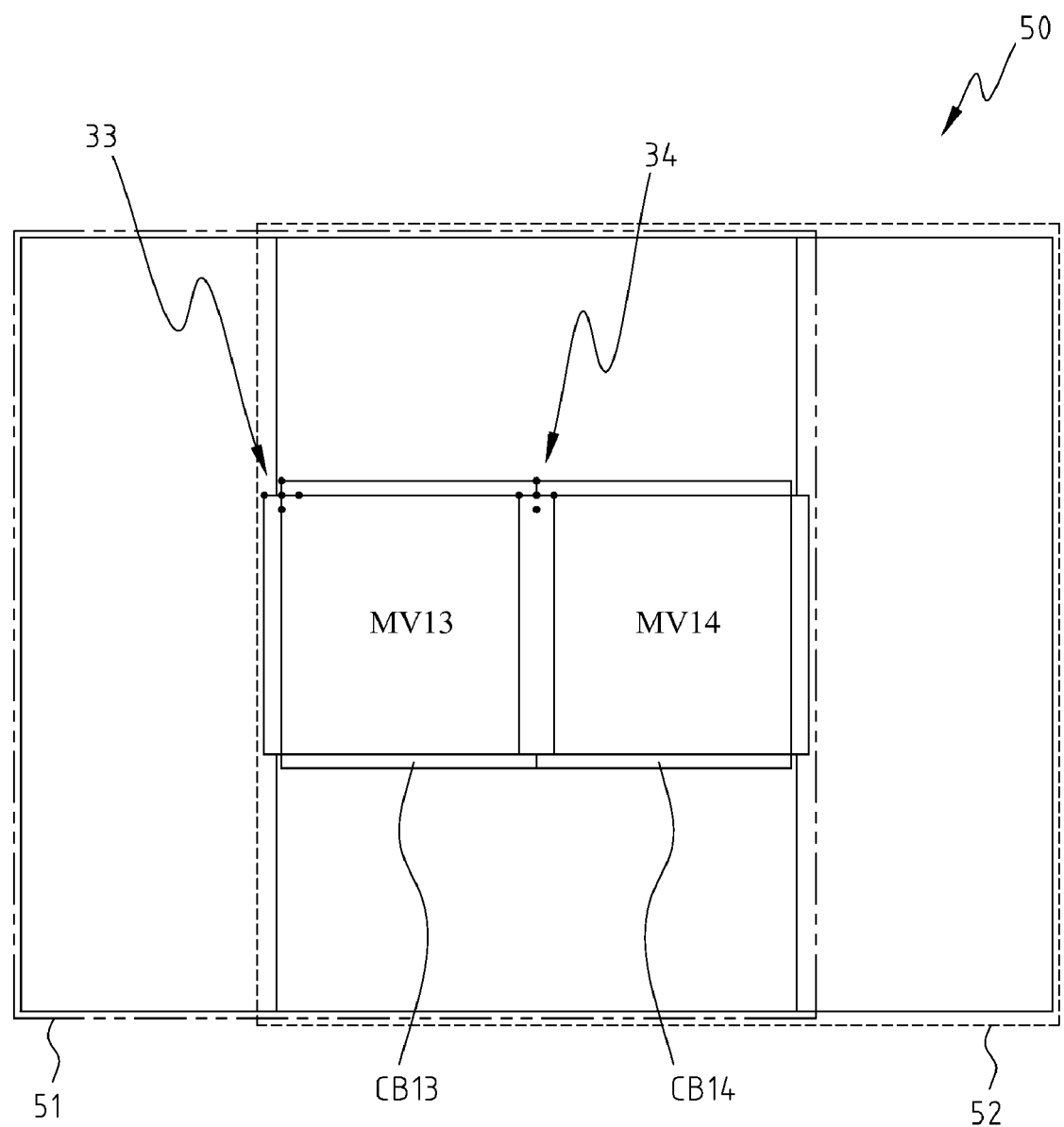
FIG. 12 is a schematic diagram illustrating a searching path for searching for a standard image according to the method of fast motion estimation of the present invention.

FIG. 12 is a schematic diagram illustrating a searching path for searching for a standard image according to the method of fast motion estimation of the present invention. Referring to FIG. 12, the search range 50 is exemplified as having a width 64 and a height 48. The search range 50 is partitioned into two search bands 51, and 52. An overlap region of the search band 51 and 52 is 32×48, where each chequer represents a pixel 35. Taking the blocks CB13, CB14 in the search range 50 for example for further illustration, both of the current blocks CB13 and CB14 have a size 16×16, and the current block CB13 has a motion vector MV13, and the current block CB14 has a motion vector MV14. The current block CB13 has a search path, i.e., search algorithm 33, and the current block CB14 has a search path, i.e., search algorithm 34. The search algorithms 33 and 34 for example are exemplified by the diamond search algorithm. It should be noted, that the method of fast motion estimation shown in the current embodiment uses the search algorithm having a search space with one pixel as a searching unit. In other words, distance of the upper, lower, left, and right points of the search algorithms are one pixel. Therefore, the data required to be loaded for a next search is 16. As such, the method of fast motion estimation is adapted for very effectively searching, and thus improving the blindly searching disadvantage of the conventional technology.

In the current embodiment, the image pattern employed in FIG. 12 is a test image sequence "Container" defined by the Standard Association, i.e., an image that exhibits a lower mobility and regular variation. It can be learnt from FIG. 12, the current block 13 rapidly obtains the desired best matched point according to the search algorithm 33, and then the next current block CB14 is going to be processed. The internal memory required for processing the current block CB14 is 320, and the external memory bandwidth required for processing the current block CB14 is 288. Comparing with the Level C scheme, the size of the internal memory of the current embodiment is about 14.5% of that of the Level C scheme, and the external memory bandwidth of the current embodiment is about 38.3% of that of the Level C scheme.

Figure 13:
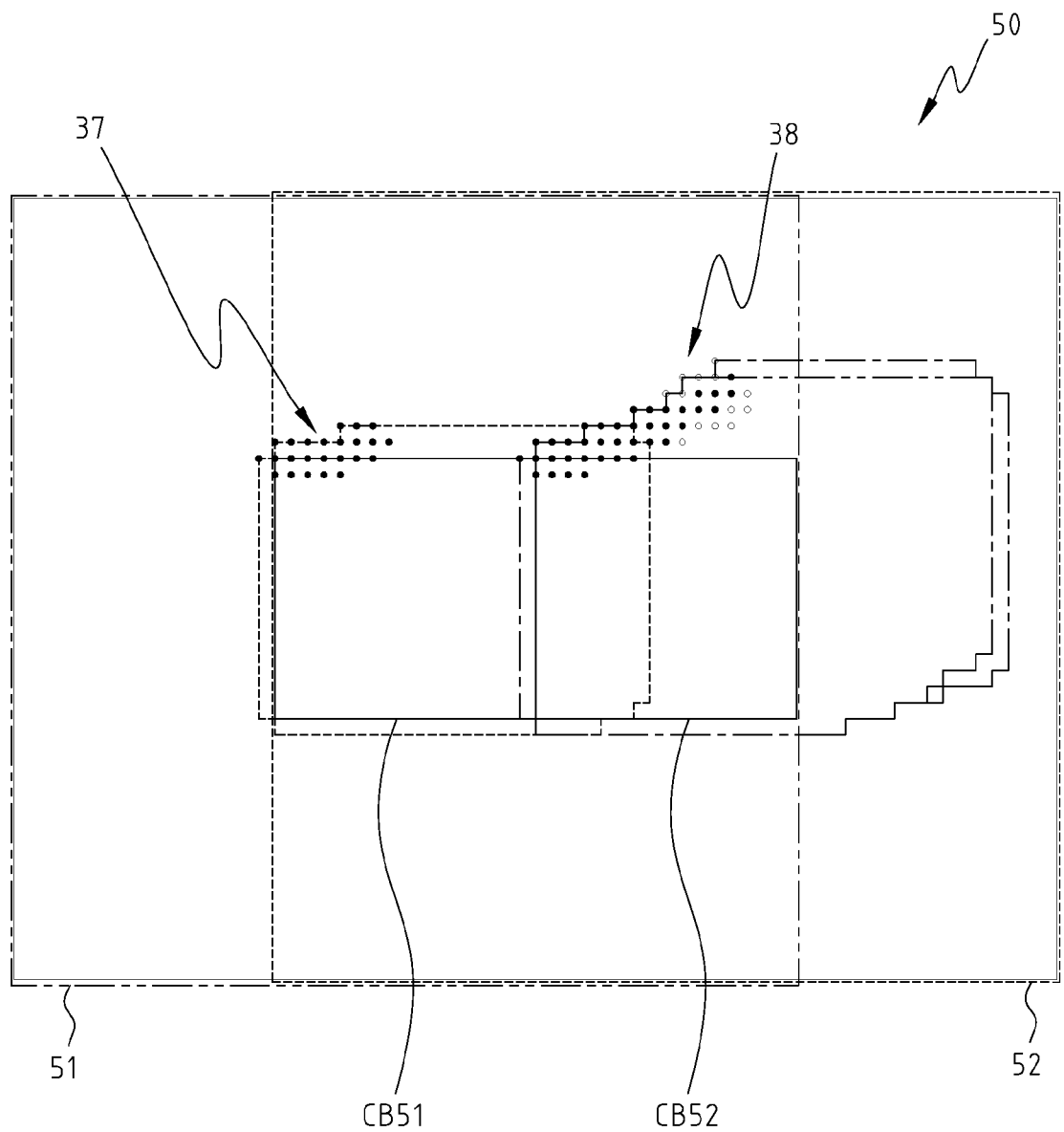
FIG. 13 is a schematic diagram illustrating a searching path for searching for another standard image according to the method of fast motion estimation of the present invention.

FIG. 13 is a schematic diagram illustrating a searching path for searching for another standard image according to the method of fast motion estimation of the present invention. Referring to FIG. 13, the image pattern employed in FIG. 13 is a test image sequence "Stefan" defined by the Standard Association, i.e., an image that exhibits a higher mobility and an irregular variation. As shown in FIG. 13, the current blocks CB51, CB52 have corresponding search algorithms 37, 38. Comparing with FIG. 12, the search algorithms 37, 38 have more search points, and therefore more search comparison processing is required for obtaining the best matching block. Comparing with the Level C scheme, the ratio of required internal memory size is 28% of that of the Level C scheme, and the ratio of require external memory bandwidth 64% of that of the Level C scheme.

As such, it can be learnt from the standard images respectively shown in FIGS. 12 and 13 that the method of fast motion estimation of the present invention requires less internal memory size and lower external memory bandwidth. However, it should be noted that although exemplified with the diamond search algorithm, the present invention is not restricted as must employ the diamond search algorithm. Other search algorithms can also be employed as an alternative. For example, a three-step search algorithm can be employed. The three-step search algorithm is executed according to a square having a predetermined side length outbound expanded from a center (i.e., the center of the current block). Nine points positioned at upper-left, upper, upper-right, right, lower-right, lower, lower-left, left, and center of the square are selected as the pixel points for search comparison. After finding out the best matched point, the best matched point is taken as a new center point, and a half of the predetermined side length is taken as a new side length to define a new square regarding the new center point and the new side length. In a similar manner, eight points positioned at upper-left, upper, upper-right, right, lower-right, lower, lower-left, and left of the new square are selected as the pixel points for a next stage of comparison processing, and so forth to find out a best matched point corresponding to the new square. The best matched point corresponding to the new square corresponds to a reference block which is the best matching block required by the current block.

Although the present invention has been described with reference to the preferred embodiments thereof, it is apparent to those skilled in the art that a variety of modifications and changes may be made without departing from the scope of the present invention which is intended to be defined by the appended claims.

What is claimed is:

1. A method of fast motion estimation, comprising:
retrieving a motion information of a current block of a current frame from a coding information;
setting up a fast prediction plane according to correlated motion vectors of neighboring blocks of the current block, wherein the fast prediction plane is determined according to the following:

$$\frac{x}{a} - \frac{y}{b} + \frac{Z(x, y)}{c} = 1$$

wherein (x, y) is the coordinate of the block center and Z(x, y) is the correlated motion vector of the coordinate (x, y), and a, b, c are respectively represented as:

$a = 16x(MV_1 - MV_2 + MV_3)/(MV_2 - MV_3)$ $b = 16x(MV_1 - MV_2 + MV_3)/(MV_1 - MV_2)$ $c = MV_1 - MV_2 + MV_3$ wherein $MV_1$, $MV_2$, and $MV_3$ are motion vectors of neighboring blocks;
estimating a predictive motion vector of the current block according to the fast prediction plane;
setting up a predictive search path according to a best search pattern of a best matching algorithm (BMA) and the predicative motion vector;
loading image data designated by the predictive search path from an external memory saving image data of a search range of a reference frame to an internal memory, and obtaining a best matched reference block according to the BMA; and
obtaining the motion vector of the current block relative to the best matched reference block.

2. The method of fast motion estimation according to claim 1, wherein the BMA determines a minimum value of a sum of absolute differences (SAD), as the best matching block, the SAD being defined by the equation of $$SAD(i, j) = \sum_{m=0}^{N-1}\sum_{n=0}^{N-1} |X(m, n) - Y(m+i, n+j)|,$$

wherein X(m, n) represents an image data of the current block at coordinates (m, n), Y(m+i, n+j) represents the image data of the reference block at coordinates (m+i, n+j), wherein both of the current block and the reference block has a size of N×N, i is a horizontal coordinate, and j is a vertical coordinate, and N, i, j, m, and n are integers.

3. The method of fast motion estimation according to claim 1, wherein the coding information is contained in a standard coding protocol MPEG-4 or H.264 /AVC.

4. The method of fast motion estimation according to claim 1, wherein the coding information comprises motion vectors of a left block, an upper-left block, and an upper block, positioned at a left side, an upper-left side, and an upper side of the current block, respectively.

5. The method of fast motion estimation according to claim 1, wherein the best matching algorithm comprises a diamond search algorithm, and the diamond search algorithm selects a center point of the current block, and four points positioned at an upper side, a left side, a lower side, and right side of the center point serving as five search comparison points for search comparison.

6. The method of fast motion estimation according to claim 1, wherein during loading image data designated by the predictive search path from an external memory saving image data of a search range of a reference frame to an internal memory, image data of two overlapped search paths of two horizontal adjacent blocks previously loaded in the internal memory is re-used based on the predictive path.

* * * * *